(12) United States Patent
Ichikawa et al.

(10) Patent No.: US 9,429,054 B2
(45) Date of Patent: Aug. 30, 2016

(54) HONEYCOMB STRUCTURE

(71) Applicant: NGK Insulators, Ltd., Nagoya (JP)

(72) Inventors: Shuichi Ichikawa, Nagoya (JP); Keisuke Kimura, Nagoya (JP); Taku Nishigaki, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 14/618,234

(22) Filed: Feb. 10, 2015

(65) Prior Publication Data

US 2015/0275725 A1  Oct. 1, 2015

(30) Foreign Application Priority Data

Mar. 26, 2014 (JP) .................. 2014-064509

(51) Int. Cl.
| | | |
|---|---|---|
| *B01D 46/24* | (2006.01) | |
| *C04B 38/00* | (2006.01) | |
| *F01N 3/022* | (2006.01) | |
| *B32B 3/12* | (2006.01) | |
| *C04B 28/24* | (2006.01) | |
| *C04B 35/565* | (2006.01) | |
| *C04B 35/63* | (2006.01) | |
| *C04B 111/00* | (2006.01) | |
| *C04B 111/20* | (2006.01) | |

(52) U.S. Cl.
CPC ......... *F01N 3/0222* (2013.01); *B01D 46/2418* (2013.01); *B01D 46/2448* (2013.01); *B01D 46/2466* (2013.01); *B32B 3/12* (2013.01); *C04B 28/24* (2013.01); *C04B 35/565* (2013.01); *C04B 35/6316* (2013.01); *C04B 38/0006* (2013.01); *C04B 2111/0081* (2013.01); *C04B 2111/00387* (2013.01); *C04B 2111/00793* (2013.01); *C04B 2111/2084* (2013.01); *C04B 2235/3217* (2013.01); *C04B 2235/3481* (2013.01); *C04B 2235/3826* (2013.01); *C04B 2235/428* (2013.01); *C04B 2235/5224* (2013.01); *Y10T 428/24149* (2015.01)

(58) Field of Classification Search
None
See application file for complete search history.

(56) References Cited

U.S. PATENT DOCUMENTS

| | | |
|---|---|---|
| 2006/0101747 A1 | 5/2006 | Masukawa et al. |
| 2008/0187712 A1 | 8/2008 | Ichikawa et al. |
| 2009/0011178 A1 | 1/2009 | Masukawa et al. |
| 2009/0041975 A1* | 2/2009 | Kodama ............. C04B 38/0019 428/116 |
| 2010/0003453 A1 | 1/2010 | Sato et al. |
| 2010/0003454 A1 | 1/2010 | Sato et al. |
| 2015/0013284 A1* | 1/2015 | Ota .................... C04B 38/0019 428/116 |

FOREIGN PATENT DOCUMENTS

| | | |
|---|---|---|
| EP | 1 860 082 A1 | 11/2007 |
| EP | 2 123 617 A1 | 11/2009 |

(Continued)

OTHER PUBLICATIONS

Extended European Search Report (Application No. 15156487.9) dated Jan. 29, 2016.

*Primary Examiner* — David Sample
*Assistant Examiner* — Nicholas W Jordan
(74) *Attorney, Agent, or Firm* — Burr & Brown, PLLC

(57) ABSTRACT

In a honeycomb structure, a bonding material monolithically bonds a plurality of honeycomb segments. The bonding material contains crystalline anisotropic ceramic particle and a particulate pore former. The crystalline anisotropic ceramic particle is 20 mass % or less. An average particle diameter of the pore former in the bonding material is 80 to 200 μm. In the case where a compressive Young's modulus of the bonding material is assumed as E (unit: MPa) and a shear strength of the bonding material is assumed as σ (unit: kPa), σ/E is 5 to 50.

12 Claims, 3 Drawing Sheets

(56) References Cited

FOREIGN PATENT DOCUMENTS

| | | |
|---|---|---|
| EP | 2 138 475 A1 | 12/2009 |
| JP | 2010-012415 A1 | 1/2010 |
| JP | 2010-012416 A1 | 1/2010 |
| JP | 5281733 B2 | 9/2013 |
| JP | WO 2013145245 A1 * 10/2013 ......... C04B 38/0006 |
| WO | 2007/119407 A1 | 10/2007 |
| WO | 2008/096851 A1 | 8/2008 |
| WO | 2008/117611 A1 | 10/2008 |

* cited by examiner

HONEYCOMB STRUCTURE

The present application is an application based on JP 2014-064509 filed on Mar. 26, 2014 with Japan Patent Office, the entire contents of which are incorporated herein by reference.

BACKGROUND OF THE INVENTION

Field of the Invention

The present invention relates to a honeycomb structure where a plurality of honeycomb segments are monolithically bonded to one another with bonding materials.

A honeycomb structure has been widely used as a trapping filter for particulate matter (PM) such as a diesel particulate filter (DPF) for capturing and removing PM contained in exhaust gas discharged from, for example, a diesel engine.

The honeycomb structure used for a filter has the following structure. A plurality of cells defined by porous partition walls of, for example, silicon carbide (SiC) and functioning as channels for fluid are disposed in parallel with one another in a central axial direction. With such honeycomb structure, respective ends of adjacent cells are alternately (in a checkered pattern) plugged, so that a filter that can trap the PM is obtained.

That is, when flowing exhaust gas from one end to a predetermined cell (inlet cell) of the honeycomb structure thus plugged, this exhaust gas passes through a porous partition wall, moves to the adjacent cell (outlet cell), and then is discharged. Then, when the exhaust gas transmits the partition wall, the partition wall functions as a filter layer, thus trapping PM contained in the exhaust gas.

To use such a filter continuously over a long period of time, the filter needs to be regenerated regularly. That is, to reduce a pressure loss increased by the PM deposited inside the filter over time to return filter performance to an initial state, the PM deposited inside the filter needs to be burned with high-temperature gas and removed. During this regeneration, high thermal stress is applied to the filter due to the heat of burning the PM. This may damage the filter.

As a countermeasure to prevent the damage to the filter, the following has been proposed. The whole filter is not manufactured as monolithic honeycomb structure, but a plurality of honeycomb-shaped segments (honeycomb segments) are bonded to one another to obtain a honeycomb structure for a filter. Specifically, the plurality of honeycomb segments are monolithically bonded to one another with bonding materials that have low elastic modulus and are likely to be deformed, to obtain a segmented structure. This achieves improvement of thermal shock resistance by dispersing and reducing the thermal stress applied to the honeycomb structure during regeneration.

Heretofore, the honeycomb structure with such segmented structure conventionally preferably uses amorphous alumina silicate fiber as a main constituent of the bonding materials, which bond the plurality of honeycomb segments to one another.

However, the amorphous alumina silicate fiber corresponds to RCF, which is categorized in Category 2 (probably carcinogenic) in carcinogenicity classification (EU directive 97/69/EC "classification, packaging and labelling of carcinogenicity of artificial amorphous fiber") by the European Union (EU). In view of this, a future use of the amorphous alumina silicate fiber is expected to be difficult. Development of a honeycomb structure using a bonding material made of a constituent giving no influence on health even being absorbed into a human body as an alternative to the amorphous alumina fiber has been urgent necessity. Note that the RCF is an abbreviation for Refractory Ceramic Fiber. The RCF defined by the EU rule (1282/2008 CLP rule) contains an alkali and an alkali earth oxide, which are an artificial (non-natural) amorphous fiber, by 18 weight % or less.

Under such a background, as a constituent of the bonding material, a honeycomb structure using a bio-soluble fiber, which does not affect health even if being absorbed into a human body, instead of the RCF, has been proposed (see Patent Documents 1 to 3). However, the bio-soluble fiber has the following problem. Due to a pH change by alkali or an alkaline earth element contained in the bio-soluble fiber, viscosity (fluidity) of a bonding material slurry (slurry containing a constituent of a bonding material), which is used for forming the bonding material, changes. Patent Documents 1 to 3 have proposed solutions for this problem. However, the bonding material slurry is unstable depending on a composition and a manufacturing process of the bonding material slurry and a change of a manufacturing condition and the like. Therefore, there is a problem that the bonding material slurry is less likely to be handled for industrial mass production.

There has also been proposed that as the constituent of the bonding material, neither the RCF nor the bio-soluble fiber is used, but plate-shaped particles and non-plate-shaped particles are used at a certain ratio to improve a relationship between the Young's modulus and strength of the bonding material (see Patent Documents 4 and 5). Although these measures can improve the relationship between the Young's modulus and the strength of the bonding material, this requires a large amount of plate-shaped particles of approximately 30 to 50 mass %. Accordingly, this has a problem of generating anisotropy in properties of the bonding material. That is, by orientating the plate-shaped particles in the bonding material parallel to a bonding surface, the strength and the Young's modulus values of the bonding material differ between a longitudinal direction and a radial direction of a honeycomb structure. Thus, if such a bonding material is used for the DPF, there is a concern that durability thereof degrades in some cases due to a change in a way of generating internal stress.

Further, there has also been proposed a honeycomb structure constituted by monolithically bonding a plurality of honeycomb segments to one another with bonding materials containing particulate fillers (see Patent Document 6). Although the bonding material containing the particulate fillers is effective to reduction of a defect caused by improving a coating property and spreadability of the bonding material, the bonding material fails to obtain the strength and the Young's modulus appropriate for use is the DPF.

[Patent Document 1] WO 2007/119407
[Patent Document 2] JP-A-2010-12415
[Patent Document 3] JP-A-2010-12416
[Patent Document 4] WO 2008/96851
[Patent Document 5] WO 2008/117611
[Patent Document 6] JP-B2-5281733

SUMMARY OF THE INVENTION

The present invention has been considering these conventional circumstances, and an object of the invention is to provide the following honeycomb structure. The honeycomb structure is constituted using a bonding material, which is made of a substance that does not affect health. The bonding material has no anisotropic property, is likely to be industrially mass-produced, and has a stable property.

To achieve the object, according to the present invention, the following honeycomb structure is provided.

According to a first aspect of the present invention, a honeycomb structure includes a plurality of cells that are disposed parallel to one another in a central axis direction and are defined by a porous partition wall to make channels for a fluid, the honeycomb structure including: a plurality of honeycomb segments that each have a shape constituting a part of a whole structure is provided, the honeycomb segments constituting the whole structure by being assembled in a direction perpendicular to the central axis, a bonding material that monolithically bonds the honeycomb segments, the bonding material containing crystalline anisotropic ceramic particle being 20 mass % or less and a particulate pore former whose average particle diameter in the bonding material being 80 to 200 μm, and σ/E being 5 to 50 in a case where a compressive Young's modulus of the bonding material is assumed as E (unit: MPa) and a shear strength of the bonding material is assumed as σ (unit: kPa).

According to a second aspect of the present invention, the honeycomb structure according to the first aspect is provided is configured as follows. The bonding material has a compressive Young's modulus of 5 to 100 MPa.

According to a third aspect of the present invention, the honeycomb structure according to the first or second aspects is provided is configured as follows. The bonding material has a shear strength of 100 to 2000 kPa.

According to a fourth aspect of the present invention, the honeycomb structure according to any one of the first to third aspects is provided is configured as follows. The crystalline anisotropic ceramic particle is a substance of one kind or more selected from the group consisting of wollastonite, mica, talc, sepiolite, alumina fiber, mullite fiber, carbon fiber, silicon carbide fiber, boron nitride fiber, potassium titanate fiber, and zinc oxide fiber.

According to a fifth aspect of the present invention, the honeycomb structure according to any one of the first to fourth aspects is provided is configured as follows. The bonding material has a porosity of 45% or more.

According to a sixth aspect of the present invention, the honeycomb structure according to any one of the first to fifth aspects is provided is configured as follows. The bonding material has a pore distribution with a peak in a range of a pore diameter of 80 to 200 μm.

According to a seventh aspect of the present invention, the honeycomb structure according to any one of the first to sixth aspects is provided is configured as follows. The bonding material has a thickness of 0.5 to 3.0 mm.

Since the honeycomb structure of the present invention is constituted of the bonding material made of a substance that does not affect the health, the honeycomb structure is excellent in environment safety. Additionally, since the content of the crystalline anisotropic ceramic particle, which is the constituent of the bonding material, is comparatively little, the property of the bonding material is less likely to be anisotropic. Further, as the constituent of the bonding material, the pore former whose average pore diameter in the bonding material is within the predetermined range is used to form large pores, which contribute the low Young's modulus of the bonding material, while ensuring the strength required for the bonding material. Consequently, the shear strength and the compressive Young's modulus of the bonding material have the relationship appropriate for reducing the thermal stress, thus forming the honeycomb structure preferably applicable to a product where high thermal stress is applied, such as the DPF. Furthermore, most of the large pores, which contribute to the low Young's modulus of the bonding material, are formed with the pore former, not with the residual water in the bonding material, which allows the stability of the size of pores in the bonding material. This stabilizes the property of the bonding material and facilitates industrial mass production of the bonding materials.

DETAILED DESCRIPTION OF THE INVENTION

Hereinafter, the present invention will be described by specific embodiments, but should not be interpreted as being limited to them. Various alterations, modifications, or improvements may be added to them based on knowledge of those skilled in the art as far as it does not depart from the scope of the present invention.

Figure 1:
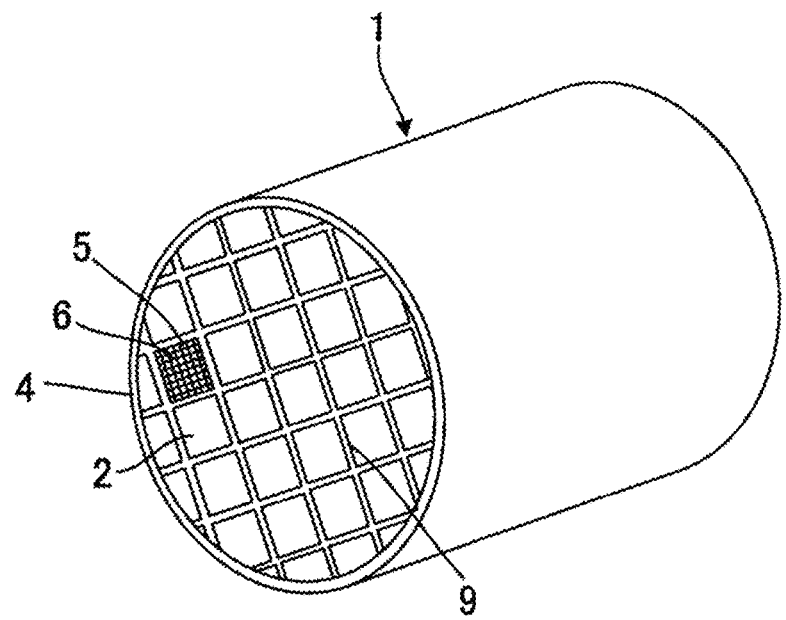
FIG. 1 is a perspective view schematically showing an exemplary honeycomb structure of an embodiment of the present invention.
Figure 2:
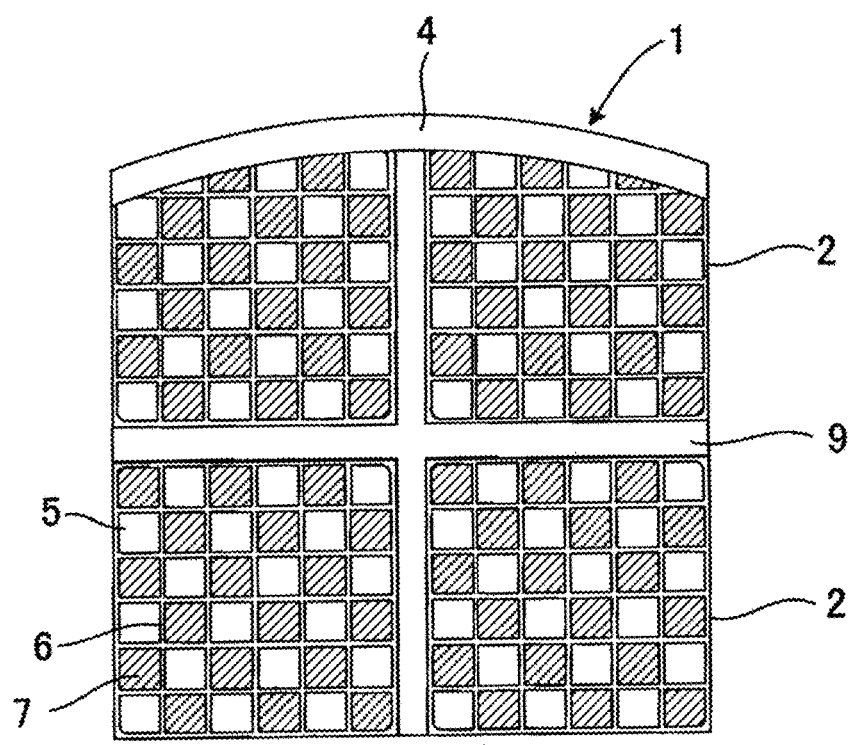
FIG. 2 is an enlarged view of a main part of FIG. 1.
Figure 3:
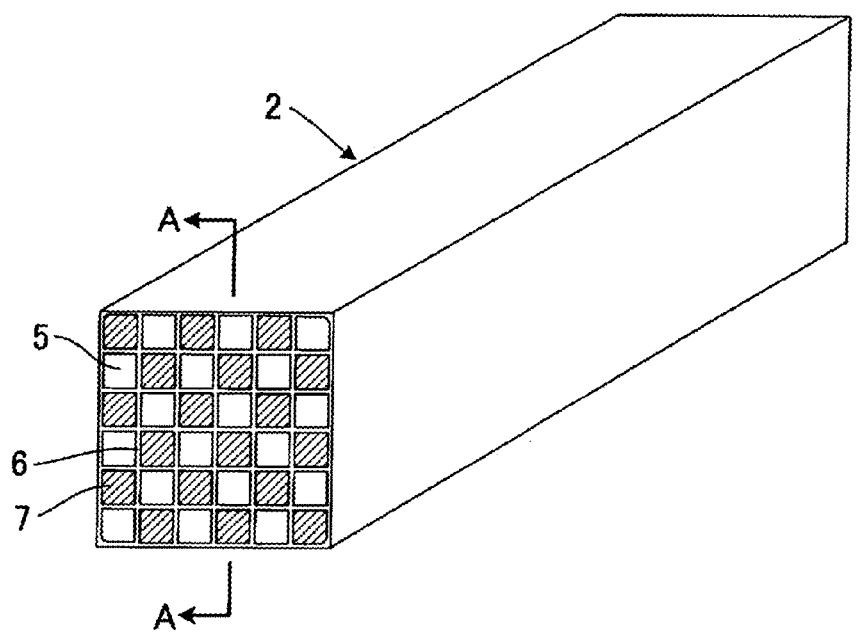
FIG. 3 is a perspective view schematically showing a honeycomb segment used in an exemplary honeycomb structure of the embodiment of the present invention.
Figure 4:
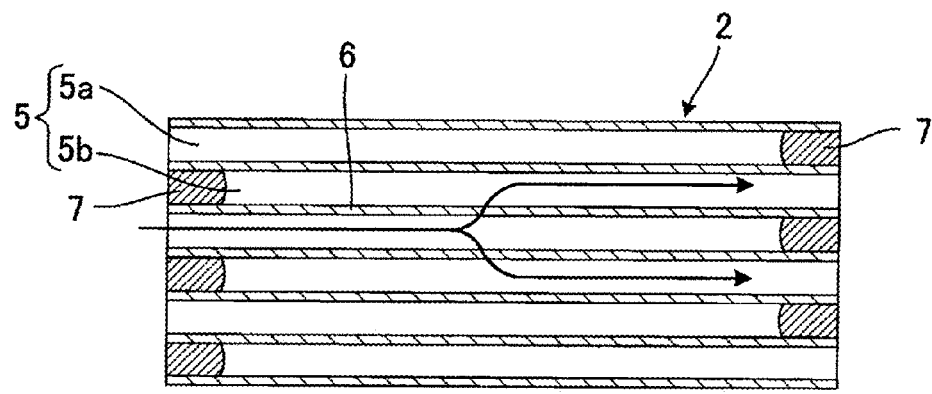
FIG. 4 is a cross-sectional view taken along the line A-A of FIG. 3.

FIG. 1 is a perspective view schematically showing an exemplary honeycomb structure of an embodiment of the present invention. FIG. 2 is an enlarged view of a main part of FIG. 1. FIG. 3 is a perspective view schematically showing a honeycomb segment used in an exemplary honeycomb structure of the embodiment of the present invention. FIG. 4 is a cross-sectional view taken along the line A-A of FIG. 3.

As shown in FIG. 1 and FIG. 2, a honeycomb structure 1 of the present invention has the following structure. The honeycomb structure 1 includes a plurality of cells 5 that is defined by a porous partition wall 6. The cells 5 are arranged in a central axis direction of the honeycomb structure 1 parallel to one another and become channels for a fluid. This honeycomb structure 1 is formed by monolithically bonding a plurality of honeycomb segments 2 to one another with bonding materials 9. The plurality of honeycomb segments 2 each have a shape constituting a part of the whole structure of the honeycomb structure 1 and are assembled perpendicular to the central axis of the honeycomb structure 1, thus constituting the whole structure. FIG. 1 draws some partition walls 6 and cells 5 of the honeycomb segments 2 omitting the honeycomb segments 2.

Usually, after bonding the plurality of honeycomb segments 2 to one another with the bonding materials 9, the whole cross-sectional shape cut along a plane perpendicular to the central axis of the honeycomb structure 1 is subjected to grinding step so as to have a circular shape, an oval shape, a triangular shape, a square shape, or other shapes and a circumference surface of the cross section is coated with a coating material 4.

In the case where the honeycomb structure 1 of the present invention is used as a filter such as the DPF, ends of the adjacent cells 5 are each alternately plugged with fillers 7. In the example of FIG. 4, the left end side of the predetermined cell 5 (inlet cell 5a) is open while the right end side thereof is plugged with the filler 7. Another cell 5 (outlet cell 5b), which is adjacent to the predetermined cell 5, is plugged with the filler 7 by the left end side and is open by the right end side. By this plugging, as shown in FIG. 2 and FIG. 3, end faces of the honeycomb segments 2 form a checkered pattern. When disposing the honeycomb structure 1 where such a plurality of honeycomb segments 2 are bonded to one another in an exhaust system, such as a diesel engine, exhaust gas flows from the left-side open ends in FIG. 4 to the inside of the cells 5 of the respective honeycomb segments 2 to move to the right side.

FIG. 4 shows a case where the left side of the honeycomb segment 2 is an inlet for the exhaust gas. In such a case, the exhaust gas flows from the cells 5 (inlet cells 5a), which are not plugged but open, to the inside of the honeycomb segments 2. The exhaust gas flowed in the cell 5 (inlet cell 5a) passes through the porous partition wall 6 and flows out from the adjacent other cell 5 (outlet cell 5b). When the exhaust gas passes through the partition wall 6, PM, such as soot, contained in the exhaust gas is captured by the partition wall 6, so that the exhaust gas is purified. Such capturing of PM deposits the PM, such as the soot, on the inside of the honeycomb segment 2 over time. Since this increases pressure loss, a regeneration process, which burns this PM, is performed.

FIGS. 2 to 4 show the honeycomb segments 2 where the whole cross-sectional shape is a square shape. However, the whole cross-sectional shape of the honeycomb segments 2 may be a shape such as the triangular shape and the hexagonal shape. The cross-sectional shape of the cell 5 of the honeycomb segment 2 shown in FIG. 2 to FIG. 4 is the quadrangular shape. However, the cross-sectional shape of the cell 5 may be the triangular shape, the hexagonal shape, the circular shape, the oval shape, and other shapes.

As shown in FIG. 2, the bonding material 9 is applied over the outer circumference surfaces of the honeycomb segments 2 to function as bonding the honeycomb segments 2 to one another. Application of the bonding material 9 over the bonding surfaces of the honeycomb segments 2 may be performed over the outer circumference surfaces of each adjacent honeycomb segments 2. However, between the honeycomb segments 2 adjacent to one another, the application may be performed only on one opposed outer circumference surface. Such application only on one side of the opposed surface is preferable in that a usage of the bonding material 9 can be saved. The thickness of the bonding material 9 is determined considering a bonding force between the honeycomb segments 2. The thickness is appropriately selected in a range of, for example, 0.5 to 3.0 mm.

In the present invention, the bonding material 9 contains crystalline anisotropic ceramic particle and particulate pore former as required constituents.

The RCF defined in the EU rule (1282/2008 CLP rule) is limited to "amorphous" material, and the "crystalline" anisotropic ceramic particle does not correspond to the RCF. In the present invention, the "anisotropic ceramic particle" means ceramic particle where a shape of primary particles is anisotropic. In the present invention, as the crystalline anisotropic ceramic particle used as the constituent of the bonding material 9, the shape of the primary particles is preferable to be a plate shape or a needle shape.

Here, the "plate shape" means that a ratio of a diameter of a particle to a thickness of the particle (diameter/thickness), namely, an aspect ratio is five or more. When using the crystalline anisotropic ceramic particle whose primary particle shape is the plate shape, the aspect ratio thereof is preferable to be 20 or more.

The "needle shape" means that the diameter of the particle is 3 μm or more and the length of the particle is 50 μm or more. The reason for setting the diameter 3 μm or more is that it is generally said that the diameter of the particle possibly affects a human body when the particle penetrates a lung is less than 3 μm. The reason for setting the length 50 μm or more is that the length of less than 50 μm makes it difficult to reduce the Young's modulus of the bonding material to a desired low value. When using the crystalline anisotropic ceramic particle whose primary particle shape is the needle shape, the diameter is preferable to be 5 μm or more considering influence on health, and the length is preferable to be 100 μm or more considering the low Young's modulus of the bonding material.

In the present invention, a natural mineral or an artificial ceramic fiber may be used for the crystalline anisotropic ceramic particle. As the natural mineral, the plate-shaped or needle-shaped natural mineral, such as wollastonite, mica, talc, sepiolite, palygorskite, and attapulgite, is preferable. As the artificial ceramic fiber, the artificial ceramic fiber that does not affect the health, such as alumina fiber, mullite fiber, carbon fiber, silicon carbide fiber, boron nitride fiber, potassium titanate fiber, or zinc oxide fiber, is preferable. It is preferable that the bonding material 9 of the present invention contain a substance of one kind or more selected from these natural minerals and ceramic fibers as the crystalline anisotropic ceramic particle. Regarding the mica, the use of a calcined one (calcined mica) is preferable. In this case, a calcining temperature is preferable to be 800° C. or more.

In the present invention, a content of the crystalline anisotropic ceramic particle contained in the bonding material 9 is 20 mass % or less and preferable to be 15 mass % or less. If the content of the crystalline anisotropic ceramic particle contained in the bonding material is too much, a property difference between the radial direction (X direction) and the longitudinal direction (Y direction) of the honeycomb structure manufactured using the bonding material becomes large. In particular, the strength in the longitudinal direction, that is, the strength corresponding to shear strength is degraded. In the case where the content of the crystalline anisotropic ceramic particle contained in the bonding material is 20 mass % or less, the large property difference (anisotropic property) is less likely to occur between the radial direction (X direction) and the longitudinal direction (Y direction) of the honeycomb structure as described above. To sufficiently maintain good strength of the whole bonding material, a lower limit of the content of the crystalline anisotropic ceramic particle contained in the bonding material is preferable to be 2 mass %.

In the present invention, the particulate pore former used as the constituent of the bonding material 9 has an average particle diameter of 80 to 200 μm in the bonding material, preferably, 100 to 150 μm. Here, the reason for specifying as the "average particle diameter in the bonding material" is because that depending on the kind of the pore former, the average particle diameter of a single pore former and the average particle diameter contained in the bonding material may differ. For example, the average particle diameter changes before and after a foaming process in the case where the pore former is a foamable resin. Additionally, the average particle diameter changes before and after water absorption in the case where the pore former is water absorbable resin. In the case where the pore former is the foamable resin, the "average particle diameter in the bonding material" means the average particle diameter in a bonding portion after the foamable resin swells by the foaming. In the case where the pore former is the water absorbable resin, the "average particle diameter in the bonding material" means the average particle diameter in the bonding portion after the water absorbable resin swells by the water absorption. Here, the "average particle diameter" is a value measuring a state before use for bonding with a particle size analyzer by a laser diffraction method. In the present invention, the "particulate" of the "particulate pore former" has an isotropic shape including a spherical shape and means that a ratio of a long axis diameter to a short axis diameter measured by image analysis where a plurality of particle images are captured with an electron microscope, an optical microscope, and the like is 5 or less.

The reason for setting the lower limit of the average particle diameter as 80 μm is that an experiment has found that the pore former with the average particle diameter of 80 μm or more is required in order to achieve the high strength and the low Young's modulus, in particular, the low Young's modulus, where a ratio of the shear strength to the Young's modulus is in a predetermined range. The reason for setting the upper limit of the average particle diameter as 200 μm is that an experiment has found that the pore former with the average particle diameter of 200 μm or more is required in order to achieve the high strength and the low Young's modulus, in particular, the high strength, where the ratio of the shear strength to the Young's modulus is in a predetermined range.

A large-diameter pore, which contributes to the low Young's modulus of the bonding material 9, can be formed with residual water, which is generated by increasing an amount of water in the bonding material, for example, as disclosed in JP B2-4927710, without the use of the pore former with large average particle diameter like the present invention. However, the pore thus formed with the residual water has the problem on industrial mass production in which the size of the pore is unstable due to a balance with other constituent of the bonding material, that is, the property is not stabilized. The present invention forms most large-diameter pores, which contribute to the low Young's modulus of the bonding material 9, with the pore former with a predetermined average particle diameter, not with the residual water in the bonding material. This allows solving the problem.

In the present invention, the pore former may be made of an inorganic substance or may be made of an organic substance. As the pore former made of the inorganic substance, for example, a hollow inorganic balloon, such as fly ash balloon or "Shirasu" balloon, is preferable. As the pore former made of the organic substance, for example, a hollow or solid organic balloon, such as a foamable resin, a water absorbable resin, or a starch is preferable. An amount of doped pore former is preferable to be 0.1 to 10 mass %, and more preferable to be 0.3 to 5 mass %.

The constituent of the bonding material 9 other than the crystalline anisotropic ceramic particle and the pore former is, for example, inorganic particles, such as silicon carbide, silicon nitride, cordierite, alumina, mullite, aluminum titanate, and zirconium phosphate. Additionally, a colloidal sol, such as colloidal silica and colloidal alumina, or a metal fiber may be added. Further, as necessary, to control fluidity and a property of the bonding material slurry, adding a small-particle diameter pore former is desirable. The "small-particle diameter pore former" means a pore former whose average particle diameter in the bonding material is smaller than the above-described pore former whose average particle diameter in the bonding material is 80 to 200 μm. This small-particle diameter pore former may be made of an inorganic substance or an organic substance. In particular, using the foamable resin made of the organic substance is preferable. In addition to these constituents, to adjust viscosity of the bonding material slurry, the organic binder, the inorganic binder, and surfactant may be used. As the organic binder, methylcellulose, hydroxypropoxylmethylcellulose, carboxymethyl cellulose, polyvinyl alcohol, and the like are preferable. As the inorganic binder, a clay mineral, such as bentonite or montmorillonite, is preferable. Further, a dispersing agent such as polyethylene glycol oleic acid ester may be added.

In the present invention, in the case where the compressive Young's modulus of the bonding material is E (unit: MPa) and the shear strength of the bonding material is σ (unit: kPa), σ/E is 5 to 50, preferably, 10 to 40. With σ/E being less than 5 when using the honeycomb structure of the present invention for the DPF, it is likely to break the honeycomb structure due to compressive stress exposed under an operating environment of the DPF. On the other hand, with σ/E being more than 50 when using the honeycomb structure of the present invention for the DPF, it is difficult to release the thermal stress exposed under the operating environment of the DPF, which is likely to break the honeycomb structure.

In the present invention, the compressive Young's modulus of the bonding material was calculated as follows. That is, a sample including a bonding material part was cut out from the honeycomb structure by predetermined dimensions (10×10 mm to 30×30 mm and thickness: 0.5 to 3 mm). Then, a compression test was conducted in a Z-axis direction. Here, the "Z-axis direction" is a direction perpendicular to a bonding surface between the bonding material and the honeycomb segment. When conducting this test, a base material (a part of the honeycomb segment) may be attached to the sample. An inclination of stress-strain curve when applying a load to the sample in the Z-axis direction of 0 to 3 MPa was regarded as the compressive Young's modulus. The compressive Young's modulus was calculated by the following formula (1).

$$E=(W/S)\times(t/\Delta t) \quad (1)$$

E: compressive Young's modulus (MPa)
W: load (N)
S: sample area (mm$^2$)
t: sample thickness (mm)
Δt: an amount of change of the sample thickness In the present invention, the shear strength of bonding material was calculated as follows. That is, a sample including two pieces of honeycomb segments and bonding material bonding the two segments was cut out from a honeycomb structure. The shear strength was calculated from a breaking load and an area of the bonding material when a shear load was applied to the bonding material bonding the two segments in the Y-axis direction (longitudinal direction) by the following formula (2).

$$\sigma=(W/S)\times 1000 \quad (2)$$

σ: shear strength (kPa)
W: breaking load (N)
S: bonding material area (mm$^2$)

In the present invention, the compressive Young's modulus of the bonding material is preferable to be 5 to 100 MPa, and more preferable to be 15 to 80 MPa. If the compressive Young's modulus of the bonding material is less than 5 MPa, it is likely to break the honeycomb structure due to compressive stress exposed under an operating environment of the DPF when using the honeycomb structure of the present invention for the DPF. On the other hand, if the compressive Young's modulus of the bonding material is more than 100 MPa, it is difficult to release the thermal stress exposed under the operating environment of the DPF when using the honeycomb structure of the present invention for the DPF, which is likely to break the honeycomb structure.

In the present invention, the shear strength of the bonding material is preferable to be 100 to 2000 kPa and more preferable to be 300 to 1500 kPa. If the shear strength of the bonding material is less than 100 kPa, it is likely to break the honeycomb structure due to thermal stress exposed under an operating environment of the DPF when using the honeycomb structure of the present invention for the DPF. On the other hand, if the shear strength of the bonding material is more than 2000 kPa, it is difficult to release the thermal stress exposed under the operating environment of the DPF when using the honeycomb structure of the present invention for the DPF, which is likely to break the honeycomb structure.

In the present invention, a porosity of the bonding material is preferable to be 45% or more, and more preferable to be 55% or more. Here, the "porosity" is a value measured by the Archimedes method. If the porosity of the bonding material is less than 45%, it is less likely to sufficiently reduce the compressive Young's modulus of the bonding material. Consequently, when using the honeycomb structure of the present invention for the DPF, this makes it difficult to release the thermal stress exposed under the operating environment of the DPF, this is likely to break the honeycomb structure. To sufficiently maintain good strength as the entire bonding material, the upper limit of porosity of the bonding material is preferable to be 75%.

In the present invention, a pore distribution of the bonding material is preferable to have a peak in a range of the pore diameter being 80 to 200 μm, and more preferable to have a peak in a range of the pore diameter being 90 to 160 μm. Here, the "pore diameter" is a value measured by the mercury press-in method using a mercury porosimeter. The "pore distribution" is a Log differential pore volume distribution. A large pore with pore diameter of 80 to 200 μm (pore) contributes to the low Young's modulus of the bonding material. If the large number of such pores is present in the bonding material, when using the honeycomb structure of the present invention for the DPF, the thermal stress exposed under the operating environment of the DPF is likely to be released, which makes it difficult to break the honeycomb structure. The average particle diameter of pore former, an amount of added pore former, and the like can control the pore distribution of the bonding material.

The average pore diameter of the partition wall 6 of the honeycomb segment 2 used for the present invention is preferable to be 5 to 100 μm and more preferable to be 8 to 50 μm. If the average pore diameter of the partition wall 6 is less than 5 μm, the pressure loss increases excessively when using the honeycomb structure of the present invention for the DPF, possibly resulting in degrade of an output from an engine. On the other hand, the average pore diameter of the partition wall 6 of more than 100 μm may fail to obtain sufficient strength. Here, the "average pore diameter" is a value measured by the mercury press-in method using a mercury porosimeter.

The porosity of the partition wall 6 of the honeycomb segment 2 is preferable to be 30 to 85%, and more preferable to be 35 to 70%. If the porosity of the partition wall 6 is less than 30%, the pressure loss increases excessively when using the honeycomb structure of the present invention for the DPF, possibly resulting in degrade of an output from an engine. On the other hand, the porosity of the partition wall 6 of more than 85% may fail to obtain sufficient strength. Here, the "porosity" is a value measured by the Archimedes method.

The thickness of the partition wall 6 of the honeycomb segment 2 is preferable to be 6 to 70 mils (0.015 to 0.177 cm), more preferable to be 8 to 30 mils (0.020 to 0.076 cm), and further preferable to be 10 to 20 mils (0.025 to 0.050 cm). The thickness of the partition wall 6 of less than 6 mils (0.015 cm) may fail to obtain sufficient strength. On the other hand, if the thickness of the partition wall 6 is more than 70 mils (0.177 cm), the pressure loss increase excessively, which possibly results in degrade of an output from an engine when using the honeycomb structure of the present invention for the DPF.

A cell density of the honeycomb segment 2 is preferable to be 50 to 400 cells/square inch (7.7 to 62.0 cells/cm$^2$), more preferable to be 70 to 370 cells/square inch (10.8 to 57.3 cells/cm$^2$), and further preferable to be 80 to 320 cells/square inch (12.4 to 49.6 cells/cm$^2$). The cell density of the honeycomb segment 2 of less than 50 cells/square inch (7.7 cells/cm$^2$) may fail to obtain sufficient strength. On the other hand, if the cell density of the honeycomb segment 2 is more than 400 cells/square inch (62.0 cells/cm$^2$) the pressure loss increases excessively, possibly resulting in degrade of an output from an engine when using the honeycomb structure of the present invention for the DPF.

A material of the honeycomb segment 2 used for the present invention can be appropriately selected from the aspect of strength, thermal resistance, and the like. Specifically, the material can be constituted of at least one kind selected from the group consisting of silicon carbide, silicon-silicon carbide-based composite material, silicon nitride, cordierite, mullite, alumina, spinel, a silicon carbide-cordierite based composite material, a silicon-silicon carbide composite material, lithium aluminum silicate, aluminum titanate, and Fe—Cr—Al based metal. Among these materials, the material constituted of the silicon carbide or the silicon-silicon carbide-based composite material is preferable. The "silicon-silicon carbide-based composite material" is a composite material formed by using the silicon carbide as aggregates and the silicon as the bonding material.

As a method for fabricating a honeycomb segment 2, for example, first, a binder, surfactant, water as a solvent, and the like is doped to the material appropriately selected from the above-described materials to form a plastic kneaded material. The kneaded material is extruded so as to have the above-described shape. As the binder, methylcellulose, hydroxypropoxyl cellulose, hydroxyethyl cellulose, carboxymethyl cellulose, polyvinyl alcohol, and the like are preferable. Next, the formed body obtained by the extrusion is dried by microwave, hot air, and the like. After that, the formed body is sintered to obtain the honeycomb segment 2.

As a filler 7 to plug the cell 5, a material similar to the material of the honeycomb segment 2 can be used. An end face of the honeycomb segment 2 is dipped into the slurried filler 7 while the cells 5 not to be plugged are masked, so that the plugging by the filler 7 can be performed by plugging the open cells 5. Plugging by the filler 7 may be performed before or after firing, after forming the honeycomb segment 2. However, since a firing process is completed at one time, the plugging is preferable to be performed before the firing.

The slurried bonding material 9 is applied over an outer circumference surface of the honeycomb segment 2 fabricated by the above-described method. The plurality of honeycomb segments 2 are assembled so as to have a predetermined three-dimensional shape (whole structure of the honeycomb structure 1). After press-bonding the honeycomb segments 2 in this assembled state, the honeycomb segments 2 are heated and dried. Thus, an assembly formed by monolithically bonding the plurality of honeycomb segments 2 to one another are fabricated. Afterwards, this assembly is grinded to have the above-described shape, and the outer circumference surface thereof is coated with the coating material 4, and is heated and dried. Thus, the honeycomb structure 1 shown in FIG. 1 is fabricated. As a material of the coating material 4, the material similar to the bonding material 9 can be used. The thickness of the coating material 4 is, for example, appropriately selected in a range of 0.1 to 1.5 mm.

EXAMPLES

Hereinafter, the present invention will be discussed in more detail by means of examples, but the present invention is by no means limited to these examples.

Examples 1 to 16 and Comparative Examples 1 to 7

1. Fabrication of Honeycomb Segment:

As a honeycomb segment raw material, silicon carbide powder and metallic silicon powder were mixed at a mass ratio of 80:20, and then a pore former, a binder, a surfactant, and water were added thereto to fabricate a plastic kneaded material. As the pore former, starch and foamable resin were used. As the binder, the methylcellulose and the hydroxypropoxylmethylcellulose were used. This kneaded material was extruded and dried by the microwave and the hot air, so that a honeycomb segment formed body having a partition wall thickness of 310 μm, the cell density of approximately 46.5 cells/cm$^2$ (300 cells/square inch), a quadrangular cross section at one side of 35 mm, and the length of 152 mm was obtained. One end of each cell was plugged such that the end face of this honeycomb segment formed body forms a checkered pattern. That is, the adjacent cells were plugged so as to be plugged at the end on the opposite side to one another. As the filler for plugging the end of the cell, the material similar to the honeycomb segment raw material was used. After drying this filler, the honeycomb segment formed body was degreased at approximately 400° C. under air atmosphere. Further, the honeycomb segment formed body after degreasing was fired in an Ar inert atmosphere at approximately 1450° C. Thus, a porous honeycomb segment made of the silicon-silicon carbide-based composite material was obtained.

2. Preparation of Bonding Material:

The crystalline anisotropic ceramic particles and the pore formers of the kinds and dimensions shown in Table 1 and the silicon carbide powder were combined at the amount of combination shown in Table 1. Further, alumina powder and cordierite powder by an amount of subtracting a total amount of these combinations from 100 mass % were added to compound a raw material powder for the bonding material. Note that Comparative Example 2 does not combine the crystalline anisotropic ceramic particle to the raw material powder of the bonding material. In addition, Comparative Example 3 does not combine the pore former to the raw material powder of the bonding material. Regardless of whether the crystalline anisotropic ceramic particle is needle-shaped particles (for example, the alumina fiber) or the plate-shaped particles (for example, calcined mica), the "Average diameter" of the crystalline anisotropic ceramic particles shown in Table 1 was an average value of diameters of the particles. The "Average length" shown in the same table is an average value of a length of the particles in the case where the crystalline anisotropic ceramic particle is needle-shape and is an average value of a thickness of the particles in the case where the crystalline anisotropic ceramic particle is plate-shape. With the needle-shaped particles, the diameter and the length thereof have the relationship of "diameter<length" while with the plate-shaped particles, the diameter and the length (thickness) thereof have the relationship of "diameter>length (thickness)." In the case where the pore former is a foamable resin, the average particle diameter of the pore former shown in Table 1 is the average particle diameter in the bonding portion after the foamable resin swells by foaming. In the case where the pore former is a water absorbable resin, average particle diameter is the average particle diameter in the bonding portion after the water absorbable resin swells by water absorption. To the raw material powder of 100 mass % obtained as described above, as a superaddition, colloidal silica, an organic binder, and water by the amount shown in Table 1 and an appropriate amount of dispersing agent were added and mixed. The colloidal silica at a solid content of 40% was used. As the organic binder, carboxymethyl cellulose was used. As the dispersing agent, polyethylene glycol oleic acid ester was used. Afterwards, this mixture was kneaded for 30 minutes with a mixer to obtain a pastelike bonding material composition (bonding material slurry). Further, water was added so as to adjust viscosity of the pastelike bonding material composition being 600 to 800 dPa·s. For the low Young's modulus of the bonding material, the composition is adjusted for all the bonding material compositions such that the porosity of the bonding material finally formed from this composition becomes 50% or more. Specifically, the composition where pores are not sufficiently formed with the pore former is adjusted by increasing a combination proportion of water to ensure the porosity of 50% or more.

3. Fabrication of Honeycomb Structure:

The bonding material composition was applied over an outer wall surface of the honeycomb segment so as to have a thickness of approximately 1 mm. Another honeycomb segment was placed on the outer wall surface. This process was repeated to fabricate a honeycomb segment laminated body formed of a total of 16-piece honeycomb segments assembled by four pieces×four pieces. Furthermore by applying external pressure, the honeycomb segments, which constitute the honeycomb segment laminated body, were press-bonded while being dried at 140° C. for two hours, thus obtaining a honeycomb segment assembly. Next, an outer circumference of the honeycomb segment assembly was grinded such that the whole cross-sectional shape cut along a plane perpendicular to a central axis of this honeycomb segment assembly became a circular shape. Afterwards, a coating material with the same composition as the bonding material was applied over the processed surface and was dried and hardened for two hours at 700° C., thus obtaining the honeycomb structures of Examples 1 to 16 and Comparative Examples 1 to 7 were obtained.

Figure 5:
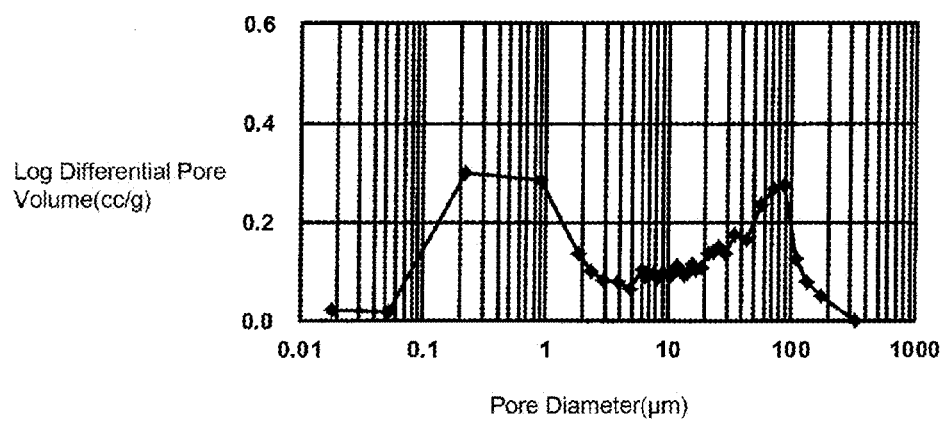
FIG. 5 is a graph showing a pore distribution (Log differential pore volume distribution) of a bonding material of the honeycomb structure obtained in Example 1.
Figure 6:
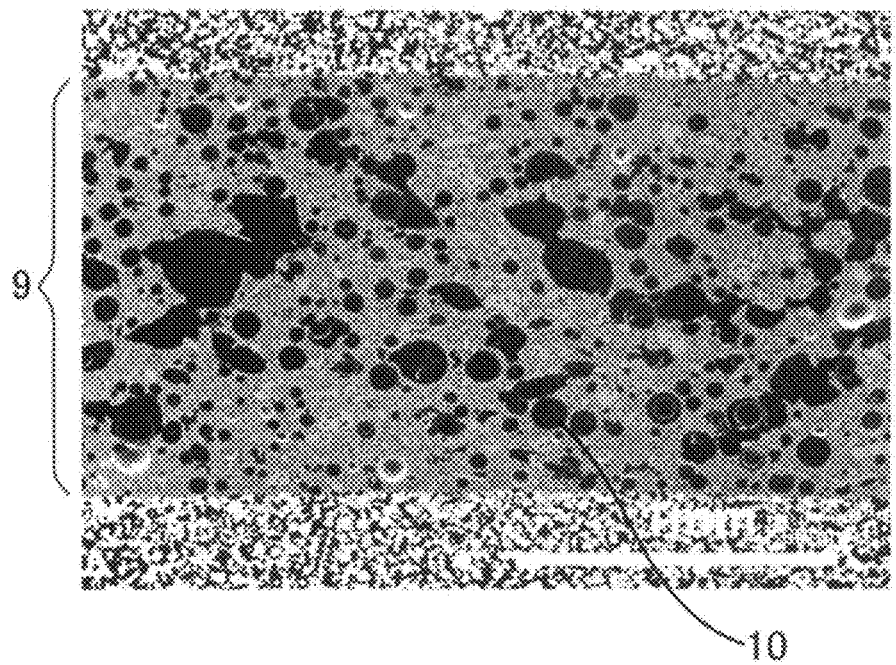
FIG. 6 is a photograph of an SEM (scanning electron microscope) image showing a microstructure of the bonding material of the honeycomb structure obtained in Example 1.
Figure 7:
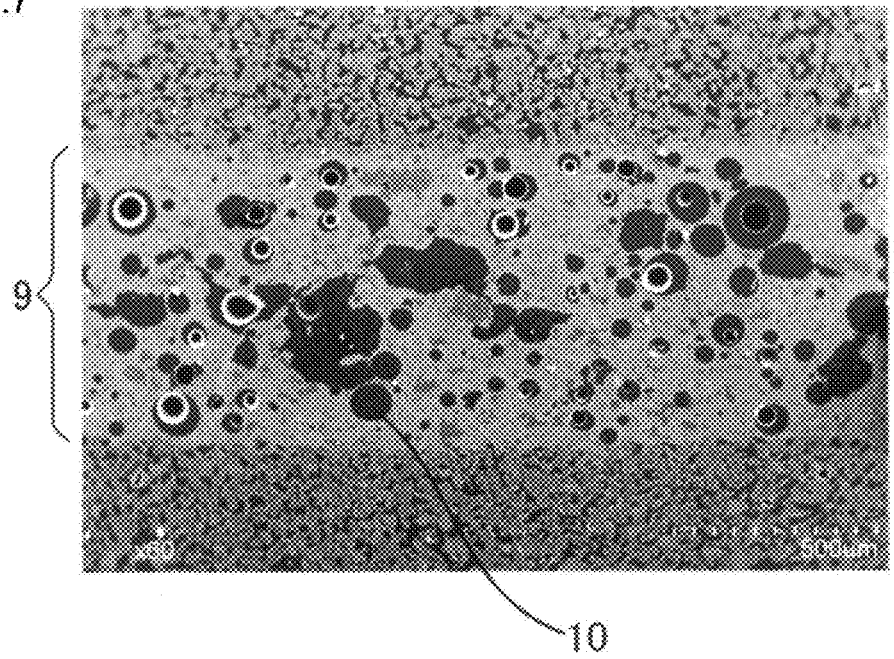
FIG. 7 is a photograph of an SEM (scanning electron microscope) image showing a microstructure of a bonding material of a honeycomb structure obtained in Example 9.

4. Evaluation Test:

A sample was cut out from each obtained honeycomb structure. The compressive Young's modulus in the Z-axis direction, the shear strength, and the porosity of each sample were measured. Further, a rapid cooling test (electric furnace spalling (E-sp) test) and an engine test (E/G test) were conducted on each honeycomb structure. These measurement results and test results are shown in Table 2. The pore distribution of the bonding material was examined on the honeycomb structure of Example 1 and the result thereof is graphed and shown in FIG. 5. Further, photographs of the SEM (scanning electron microscope) images showing microstructures of bonding materials of the honeycomb structures of Examples 1 and 9 are shown in FIG. 6 and FIG. 7. The black parts in FIG. 6 and FIG. 7 indicated by reference numeral 10 are pores formed in the bonding materials 9 with the pore former having the average particle diameter shown in Table 1. The compressive Young's modulus, the shear strength, the porosity, and the pore diameter were measured by the method already described in this description. The rapid cooling test (electric furnace spalling (E-sp) test) and the engine test (E/G test) were respectively conducted as follows.

[Rapid Cooling Test (Electric Furnace Spalling (E-Sp) Test)]

The honeycomb structure was heated in an electric furnace at 500° C. for two hours to make a temperature of the whole honeycomb structure uniform. Then, the honeycomb structure was extracted from the electric furnace and was rapidly cooled to a room temperature. Then, after the rapid cooling, thermal shock resistance was evaluated by whether the honeycomb structure was cracked or not. In the case where a crack was not confirmed, it is determined as "Passed." In the case where a crack was confirmed, it is determined as "Failed."

[Engine Test (E/G Test)]

Exhaust gas from a diesel engine was flown to the honeycomb structure. PM was deposited inside of the honeycomb structure. The honeycomb structure was heated under a temperature condition of setting a temperature at a center portion of the honeycomb structure being 1000° C., so that the deposited PM was burned for removal. After the removal of the PM by burning, the thermal shock resistance was evaluated by whether the honeycomb structure was cracked or not. In the case where a crack was not confirmed, it is determined as "Passed." In the case where a crack was confirmed, it is determined as "Failed."

TABLE 1

| | Crystalline anisotropic ceramic particle | | | Pore former | | | Silicon carbide powder (mass %) | Colloidal silica (mass %) | Organic binder (mass %) | Water (mass %) |
| | Kind | Average diameter (μm) | Average length (μm) | Amount of combination (mass %) | Kind | Average particle diameter (μm) | Amount of combination (mass %) | | | | |
| --- | --- | --- | --- | --- | --- | --- | --- | --- | --- | --- | --- |
| Ex. 1 | Alumina fiber | 5.0 | 150 | 5 | Foamable resin | 120 | 1 | 45 | 20 | 0.5 | 15 |
| Ex. 2 | Alumina fiber | 5.0 | 150 | 5 | Foamable resin | 90 | 1 | 45 | 20 | 0.5 | 17 |
| Ex. 3 | Alumina fiber | 5.0 | 150 | 5 | Foamable resin | 180 | 1 | 45 | 20 | 0.5 | 15 |
| Ex. 4 | Alumina fiber | 5.0 | 150 | 15 | Foamable resin | 120 | 1 | 45 | 20 | 0.5 | 15 |
| Ex. 5 | Alumina fiber | 5.0 | 150 | 18 | Foamable resin | 120 | 1 | 42 | 20 | 0.5 | 15 |
| Ex. 6 | Alumina fiber | 5.0 | 150 | 5 | Foamable resin | 120 | 1 | 60 | 25 | 0.5 | 18 |
| Ex. 7 | Alumina fiber | 5.0 | 50 | 5 | Foamable resin | 120 | 1 | 30 | 25 | 0.5 | 12 |
| Ex. 8 | Alumina fiber | 5.0 | 250 | 5 | Foamable resin | 120 | 1 | 45 | 20 | 0.5 | 18 |
| Ex. 9 | Calcined mica | 35 | 0.5 | 5 | Foamable resin | 120 | 1 | 45 | 20 | 0.8 | 17 |
| Ex. 10 | Calcined mica | 35 | 0.5 | 15 | Foamable resin | 120 | 1 | 45 | 20 | 0.8 | 17 |
| Ex. 11 | Calcined mica | 35 | 0.5 | 18 | Foamable resin | 120 | 1 | 45 | 20 | 0.8 | 17 |
| Ex. 12 | Calcined mica | 50 | 1 | 5 | Foamable resin | 120 | 1 | 45 | 20 | 0.5 | 17 |
| Ex. 13 | Alumina fiber | 5.0 | 150 | 5 | Water absorbable resin | 150 | 1 | 45 | 20 | 0.5 | 23 |
| Ex. 14 | Alumina fiber | 2.0 | 150 | 5 | Foamable resin | 120 | 1 | 45 | 20 | 0.3 | 12 |
| Ex. 15 | Alumina fiber | 5.0 | 150 | 5 | Foamable resin | 120 | 0.5 | 45 | 20 | 0.5 | 14 |
| Ex. 16 | Alumina fiber | 5.0 | 150 | 5 | Foamable resin | 120 | 2 | 45 | 20 | 0.8 | 16 |
| Com. Ex 1 | Alumina fiber | 5.0 | 150 | 5 | Foamable resin | 70 | 1 | 45 | 20 | 1.0 | 20 |
| Com. Ex 2 | — | — | — | 0 | Foamable resin | 230 | 1 | 45 | 20 | 1.0 | 20 |
| Com. Ex 3 | Alumina fiber | 5.0 | 150 | 5 | — | — | 0 | 46 | 20 | 1.0 | 20 |
| Com. Ex 4 | Alumina fiber | 5.0 | 150 | 25 | Foamable resin | 120 | 1 | 45 | 20 | 1.0 | 20 |
| Com. Ex 5 | Calcined mica | 35 | 0.5 | 5 | Foamable resin | 70 | 1 | 45 | 20 | 1.2 | 15 |
| Com. Ex 6 | Calcined mica | 35 | 0.5 | 5 | Foamable resin | 230 | 1 | 45 | 20 | 1.2 | 14 |
| Com. Ex 7 | Calcined mica | 35 | 0.5 | 25 | Foamable resin | 120 | 1 | 45 | 20 | 1.0 | 18 |

TABLE 2

| | Compressive Young's modulus (E) (MPa) | Shear strength (σ) (kPa) | σ/E | Porosity (%) | E-sp test | E/G test |
| --- | --- | --- | --- | --- | --- | --- |
| Example 1 | 50 | 1000 | 20 | 60 | Passed | Passed |
| Example 2 | 75 | 1050 | 14 | 60 | Passed | Passed |
| Example 3 | 50 | 500 | 10 | 60 | Passed | Passed |
| Example 4 | 50 | 700 | 14 | 60 | Passed | Passed |
| Example 5 | 60 | 500 | 8.3 | 55 | Passed | Passed |
| Example 6 | 60 | 800 | 13 | 63 | Passed | Passed |
| Example 7 | 90 | 600 | 6.7 | 50 | Passed | Passed |
| Example 8 | 50 | 900 | 18 | 60 | Passed | Passed |
| Example 9 | 50 | 650 | 13 | 60 | Passed | Passed |

TABLE 2-continued

| | Compressive Young's modulus (E) (MPa) | Shear strength (σ) (kPa) | σ/E | Porosity (%) | E-sp test | E/G test |
|---|---|---|---|---|---|---|
| Example 10 | 40 | 400 | 10 | 60 | Passed | Passed |
| Example 11 | 30 | 300 | 10 | 63 | Passed | Passed |
| Example 12 | 40 | 500 | 12.5 | 65 | Passed | Passed |
| Example 13 | 25 | 600 | 24 | 60 | Passed | Passed |
| Example 14 | 23 | 900 | 40 | 60 | Passed | Passed |
| Example 15 | 80 | 1500 | 19 | 60 | Passed | Passed |
| Example 16 | 30 | 700 | 23 | 65 | Passed | Passed |
| Comparative example 1 | 150 | 550 | 3.7 | 60 | Passed | Failed |
| Comparative example 2 | 60 | 80 | 1.3 | 60 | Failed | Failed |
| Comparative example 3 | 20 | 2000 | 100 | 60 | Passed | Failed |
| Comparative example 4 | 25 | 1500 | 60 | 60 | Passed | Failed |
| Comparative example 5 | 140 | 450 | 3.2 | 60 | Passed | Failed |
| Comparative example 6 | 50 | 60 | 1.2 | 60 | Failed | Failed |
| Comparative example 7 | 20 | 90 | 4.5 | 60 | Failed | Failed |

(Examination)

As shown in Table 2, the honeycomb structures of Examples 1 to 16 as examples of the present invention, did not crack in both the E-sp test and the E/G test and exhibited good thermal shock resistance. On the other hand, a crack was confirmed in the E/G test of the honeycomb structure of Comparative Examples 1 and 5, which had the average particle diameter of pore former in the bonding material of less than 80 μm and σ/E of less than 5. A crack was also confirmed in the honeycomb structure of Comparative Example 2 where the bonding material did not contain the crystalline anisotropic ceramic particle, the average particle diameter of pore former in the bonding material was more than 200 μm, and σ/E was less than 5 in both the E-sp test and the E/G test. A crack was confirmed in the honeycomb structure of Comparative Example 3 where the bonding material did not contain the pore former and σ/E was more than 50 in the E/G test. A crack was confirmed in the honeycomb structure of Comparative Example 4 where a content of the crystalline anisotropic ceramic particle contained in the bonding material was more than 20 mass % and σ/E was more than 50 in the E/G test. A crack was confirmed in the honeycomb structure of Comparative Example 6 where the average particle diameter of pore former in the bonding material was more than 200 μm and σ/E was less than 5 in both the E-sp test and the E/G test. A crack was confirmed in the honeycomb structure of Comparative Example 7 where the content of the crystalline anisotropic ceramic particle contained in the bonding material was more than 20 mass % and σ/E was less than 5 in both the E-sp test and the E/G test.

The test results of Comparative Examples 1 and 5 were too high compressive Young's modulus with respect to the shear strength. This is possibly due to an insufficient reduction of the thermal stress. The test results of Comparative Examples 2, 6, and 7 were too low shear strength with respect to the compressive Young's modulus. This is possibly due to an insufficient strength required to withstand the thermal stress. Further, the test results of Comparative Examples 3 and 4 were too high shear strength with respect to the compressive Young's modulus. This is possibly due to an increase in restraint force of the honeycomb segment with the bonding material, resulting in insufficient reduction of thermal stress.

The present invention can be preferably used as a PM trapping filter such as a DPF.

DESCRIPTION OF REFERENCE NUMERALS

1: honeycomb structure, 2: honeycomb segment, 4: coating material, 5: cell, 5a: inlet cell, 5b: outlet cell, 6: partition wall, 7: filler, 9: bonding material, 10: pore

What is claimed is:

1. A honeycomb structure, comprising
   a plurality of cells that are disposed parallel to one another in a central axis direction and are defined by a porous partition wall to make channels for a fluid,
   wherein the honeycomb structure includes: a plurality of honeycomb segments that each have a shape constituting a part of a whole structure, the honeycomb segments constituting the whole structure by being assembled in a direction perpendicular to the central axis, a bonding material that monolithically bonds the honeycomb segments, the bonding material containing crystalline anisotropic ceramic particles being 20 mass % or less and a particulate pore former whose average particle diameter in the bonding material being 80 to 200 μm, and σ/E being 5 to 50 in a case where a compressive Young's modulus of the bonding material is assumed as E, expressed in MPa, and a shear strength of the bonding material is assumed as σ, expressed in kPa.

2. The honeycomb structure according to claim 1,
   wherein the bonding material has a compressive Young's modulus of 5 to 100 MPa.

3. The honeycomb structure according to claim 2, wherein the bonding material has a shear strength of 100 to 2000 kPa.

4. The honeycomb structure according to claim 3,
   wherein the crystalline anisotropic ceramic particle is a substance of one kind or more selected from the group consisting of wollastonite, mica, talc, sepiolite, alumina fiber, mullite fiber, carbon fiber, silicon carbide fiber, boron nitride fiber, potassium titanate fiber, and zinc oxide fiber.

5. The honeycomb structure according to claim 2,
   wherein the crystalline anisotropic ceramic particle is a substance of one kind or more selected from the group consisting of wollastonite, mica, talc, sepiolite, alumina fiber, mullite fiber, carbon fiber, silicon carbide fiber, boron nitride fiber, potassium titanate fiber, and zinc oxide fiber.

6. The honeycomb structure according to claim 1, wherein the bonding material has a shear strength of 100 to 2000 kPa.

7. The honeycomb structure according to claim 6,
   wherein the crystalline anisotropic ceramic particle is a substance of one kind or more selected from the group consisting of wollastonite, mica, talc, sepiolite, alumina fiber, mullite fiber, carbon fiber, silicon carbide fiber, boron nitride fiber, potassium titanate fiber, and zinc oxide fiber.

8. The honeycomb structure according to claim 1,
   wherein the crystalline anisotropic ceramic particle is a substance of one kind or more selected from the group consisting of wollastonite, mica, talc, sepiolite, alumina fiber, mullite fiber, carbon fiber, silicon carbide fiber, boron nitride fiber, potassium titanate fiber, and zinc oxide fiber.

9. The honeycomb structure according to claim 1, wherein the bonding material has a porosity of 45% or more.

10. The honeycomb structure according to claim 1, wherein the bonding material has a pore distribution with a peak in a range of a pore diameter of 80 to 200 μm.

11. The honeycomb structure according to claim 1, wherein the bonding material has a thickness of 0.5 to 3.0 mm.

12. The honeycomb structure according to claim 1, wherein the anisotropic ceramic particles are fibers having a length of at least 150 μm.

* * * * *